United States Patent Office 3,758,388
Patented Sept. 11, 1973

3,758,388
ELECTROPLATING PLASTICS
James A. Shotton, % Phillips Petroleum Company,
Bartlesville, Okla. 74004
No Drawing. Filed May 13, 1971, Ser. No. 143,147
Int. Cl. C23b 5/64
U.S. Cl. 204—20                                10 Claims

ABSTRACT OF THE DISCLOSURE

Electroplating of a moldable plastic containing a siliceous filler is achieved by conditioning a preformed article of said plastic by treatment with a high chromate-phosphate conditioning agent, thereafter preplating the conditioned article with an electrolessly platable metal, and electroplating the preplated article with a final finish to obtain a metal-plated plastic product.

This invention relates to the electroplating of plastics. In one aspect, this invention relates to a process for electroplating plastics containing a siliceous filler. In another aspect, this invention relates to a method for providing electroplated plastic articles having satisfactory adhesion of the metal plate thereto. In a further aspect, an improved method is provided for conditioning plastic articles for use in an electroplating process.

The market for electroplated plastic articles has expanded tremendously in the past few years. By electroplating plastics the inherent advantages of plastic, i.e., economy, light weight, corrosion resistance, moldability, etc., become available to both fabricators and users of electroplated parts.

Although the demand for electroplated plastics has expanded, not all plastics are capable of being plated by conventional processes due to the failure to obtain a satisfactory adhesion of the metal plate to the plastic. Heretofore, for example, olefin polymers have found little utility in the formation of plated plastic articles because it has not been possible to form a strong bond of the metal plate to the polymer surface and, further, because of the undesirably long time required for etching the polymer surface. Such difficulties apparently stem from the physical and chemical properties of the olefin polymers such as polyethylene, polypropylene, halogenated olefin polymers and the like which render them inert and accordingly unaffected by conventional etching techniques normally employed in electroplating.

In the past the most widely used plastic for electroplating has been acrylonitrile-butadiene-styrene, hereinafter referred to as ABS, since conventional plating techniques can be employed with this plastic and the plating bonds well thereto. For plastics other than ABS the poor bonding of the plate, if formed by conventional techniques, has resulted in a limited use of the product. The necessity of using other than conventional plating techniques for electroplating plastics materially increases the cost of the electroplated product and, until now, has not overcome the problem of poor bonding or adhesion of the metal plate, so that use of such plated products has been limited to small parts, such as knobs.

For these reasons as well as because of the outstanding properties possessed by other plastics, particularly the olefin polymers, there has been a continuing effort to develop a method for electroplating other plastics by conventional techniques.

Accordingly, it is an object of this invention to provide an improved process for metal plating plastics. Another object of the invention is to provide a method for producing a plated plastic article having satisfactory adhesion of the plate to the plastic surface. A further object is to provide a process for electroplating plastics which permits the use of conventional electroplating systems. Another object is to provide a method for conditioning plastics to provide a conditioned product suitable for use in conventional electroplating systems.

Other aspects, objects and the several advantages of the invention will be apparent to those skilled in the art from the following description and the appended claims.

According to this invention, an overall method is provided for electroplating a plastic which comprises the steps of (1) incorporating a siliceous filler in the plastics;
(2) molding the resulting plastic composition into the desired configuration;
(3) conditioning the resulting molded plastic product by treating with a high chromate-high phosphate acid-containing conditioning solution;
(4) preplating the conditioned article with an electrolessly platable metal; and
(5) electroplating the preplated article with a final finish to obtain a metal-plated plastic product.

Although the overall process for electroplating plastics in accordance with this invention utilizes the above steps, it is not essential that all the steps be performed at one time. Accordingly, once conditioned, the surface-conditioned molded plastic article can immediately be preplated or can be shipped to another location for further processing. Thus, the conditioning step (3) results in the formation of a novel product suitable for further processing in a conventional electroplating system.

Similarly, the electrolessly plated plastic article prepared by the above steps (1) through (4) represents a novel preplated product which can, if desired, be supplied in this form to a processor for electroplating. This is particularly advantageous when the final finish metal on the plastic article is to be of a type normally utilized and the preparation of which by the preplator would be uneconomical.

Although the process of this invention can be used for the plating of any moldable plastic, as defined herein, in a presently preferred embodiment of the invention it has been found to be particularly suitable for electroplating olefin polymers and, more particularly, propylene homopolymers and copolymers thereof with other 1-olefins. However, the term "olefin polymer" as used herein and in the claims is intended to include both homopolymers and copolymers of aliphatic 1-olefins having 2 to 8 carbon atoms, or mixtures thereof.

As indicated, the process of this invention can be utilized with any moldable plastic material. As used herein and in the claims, the term "plastic" is intended to include any natural or synthetic polymeric material which can be molded into a desired final shape using heat and/or pressure. Examples of such materials, which are listed and described in Modern Plastics Encyclopedia for 1967, are: ABS resins, acetal resins, acrylics and modified acrylics, alkyd resins, allyl resins, amino resins, halogenated polyethers, epoxy resins, fluoroplastics, furane resins, ionomers, isocyanates, nylons, parylene polymers, phenolics, phenoxy resins, polyalkenes, polycarbonates, polyesters, polyimides, polyarylene oxides, polyarylene sufides, polysulfones, silicones, styrene polymers and copolymers such as styrene/butadiene, vinyl polymers and copolymers such as poly(vinyl chloride), poly(vinyl fluoride), vinylidene chloride/vinyl chloride copolymer, and the like, including blends.

The terms "mold," "molded," "moldable," "molding" and the like, as used herein and in the claims, is intended to include any plastic forming process such as film formation by extrusion, casting or calendering, blow molding, injection molding, vacuum forming, pressure forming, compression molding, transfer molding, thermoforming, and the like.

Examples of the aliphatic 1-olefins are ethylene, propylene, 1-butene, 1-pentene, 2-methylpentene, 1-hexene, 1-heptene, 1-octene, 1,3-butadiene, 1,4-hexadiene, 1,3-heptadiene, 1,5-octadiene and the like. Examples of the olefin polymers and polymer blends that can be used are polyethylene, polypropylene, poly(butene-1), poly(2-methylpentene), ethylene/propylene copolymer, ethylene/butene-1 copolymer, ethylene/hexene-1 copolymer, ethylene/propylene/1,4-hexadiene terpolymer, ethylene/propylene/butene-1 terpolymer, polyethylene/polypropylene blends, polyethylene/polypropylene/polydiene blends, and the like.

Such polymers are known to be inert to most chemicals and, when heretofore plated, formed products having poor metal-to-plastic adhesion values. This in turn limited the end uses of such metal-plated items to those applications where strength of the bond or adhesion value was not critical.

When conducting the process of the invention with an olefin polymer, satisfactory values are achieved in the metal-to-plastic adhesion of the plated product, rendering the product useful as an article of manufacture.

The conditioning agent employed in this invention is formed by admixing (a) chromic acid, (b) phosphoric acid, and (c) sulfuric acid to form a high concentrate chromic acid-phosphoric acid solution with a low sulfuric acid concentration.

Thus, in practicing the process of the present invention, it has been found that the following percentage ranges for the chemical ingredients of the conditioning solution can be used:

|  | Weight percent |
|---|---|
| (A) Chromic acid (chromium trioxide) | 15–40 |
| (B) Phosphoric acid [1] ($H_3PO_4$) | 30–65 |
| (C) Sulfuric acid [2] | 2–15 |
| (D) Added $H_2O$ | 5–35 |

[1] 85%, d.=1.69 g./cc.
[2] 96%, d.=1.84 g./cc.

The conditioning agent is so formulated that the resulting bath preferably has a density in the range of 1.60 to 1.75 g./cc. Since the sulfuric acid decreases the solubility of the $CrO_3$ in the liquid phase, relatively low levels of this acid are employed.

The term "conditioning" as used herein is intended to cover any treatment whereby the surface of the molded plastic article is contacted with the conditioning agent, as above defined.

Conditioning step (3) of the overall process for achieving the electroplated plastic article is preferably carried out under the following conditions:

|  | Broad | Preferred |
|---|---|---|
| Time | 0.1–20 minutes | 5–10 minutes. |
| Temperature | 75–200° F | 110–140° F. |

The maximum temperature that can be used is at least 50° F. below the softening point of the plastic being treated.

According to one presently preferred embodiment of this invention, the molded plastic article is contacted, as by immersion in the conditioning agent, as above described, which is maintained at a temperature of 120° to 140° F. for a period of time ranging from 5.0 to 10.0 minutes. Thereafter the resulting conditioned article is then further treated in the subsequent step of the overall process to produce the electroplated product on which the plate material is securely adhered.

The molded articles to be treated in accordance with this invention contain a siliceous filler. The siliceous fillers which are utilized in the polymer generally are those having a particle size of less than 50 microns and preferably less than 10 microns.

In one presently preferred embodiment of the invention, precipitated silica is employed as the siliceous filler. The term "precipitated silica" is intended to include those silicas discussed in Encyclopedia of Chemical Technology, vol. 18, pp. 63, 67 and 68 (2d ed.). Precipitated silicas (commercially available products of Mallinckrodt Chemical Company, Pittsburgh Plate Glass Company, Philadelphia Quartz Company and the J. M. Huber Company) can be prepared by mixing water glass and a mineral acid in a solution containing a calcium salt to limit the silica polymerization and to cause precipitation of very fine slica particles which are washed free of electrolyte and dried.

Precipitated silicas are very finely divided silica in which the degree of polymerization is limited by the preparative technique. The ultimate silica particle has a size of about 20–50 microns and forms an agglomerated particle of 1–5 microns. Precipitated silicas have a surface area of 100–200 m.$^2$/g. and are often contaminated with calcium or other cations from the precipitating salt.

Precipitated silicas are prepared differently by each manufacturer using various patented processes. Those with high calcium content are prepared by first precipitating a fine calcium silicate and then replacing the calcium by treatment with an acid. Fine silica may also be prepared from treatment of kaolin clay and by direct precipitation from silica sols or water glass (sodium silicate) solutions neutralized in the presence of salts or miscible hydrogen-bonding solvents under carefully prescribed conditions. Details of washing and drying also are controlled to minimize aggregation of the ultimate particles which separate under the initial conditions.

The filler or mixtures thereof can be incorporated into the plastic by any known technique using known milling and blending equipment, such as a Banbury mixer, a Brabender Plastograph, and the like.

As indicated, it is desirable in the electroplating of a plastic article to be able to utilize conventional plating processes to produce a plated product having good adhesion thereto of the metal plate. Such conventional plating processes involve a preplating process which includes cleaning; etching the surface of the plastic with an acid chromate solution, such as chromic-sulfuric acid, at elevated temperatures; sensitizing the surface of the plastic with an oxidizable salt, such as stannous chloride, that is absorbed and later reduces the activator (not all conventional processes include this step); activating the surface with a precious metal salt, such as palladium chloride; and electrolessly plating with either copper (about 0.005 mil to 0.010 mil) or nickel (about 0.010 to 0.030 mil). Each step is generally followed by one or more water rinses. The continuous fim of electrically conductive material applied by the preplating process provides the capability for applying the final finish by conventional electrolytic processes. Following the preplating process, normal plating of copper-nickel-chrome, nickel-chrome, or any of a wide variety of final finishes, including gold and silver, can be applied by conventional electroplating techniques. For most applications the final plate will be about 0.5 to 2.0 mils thick, but even thicker plate can be applied, if desired.

The following procedures are representative of the conventional plating processes and conditions which can be used in the electroplating of plastics in accordance with this invention. It is to be understood that the recitation of specific plating solutions and steps in no way limits the invention to such specific solutions and steps. Numerous plating systems are available, and the process of the invention can be used with any of them so long as a conditioning treatment, as herein defined, is first employed.

(1) Immerse plastic article in a sodium pyrophosphate cleaning solution for 2 to 5 minutes at 140° F.

(2) Immerse in a sodium bisulfate neutralizing solution for 15 to 30 seconds at 75° F.

(3) Immerse in the conditioning solution for 0.1 to 20 minutes at 75° to 200° F.

(4) Rinse with 5 weight percent hydrochloric acid.

(5) Immerse in a palladium-stannous chloride complex sensitizing solution for 15 to 60 seconds at 75° F.

(6) Immerse in accelerator solution for 1 to 5 minutes.

(7a) Immerse in an electroless copper plating solution for 5 to 30 minutes at 75° F. The plating solution comprised modified Fehling solutions: solution A was $CuSO_4$ and solution B was NaOH, NaK tartrate, $Na_2CO_3$ and $NaC_2H_3O_2$, or (7b) Immerse in an electroless nickel plating solution for 5 to 30 minutes at 75° F. The plating solution usually contains nickel salts and a reducing agent such as sodium hypophosphite or a boron amine.

(8a) Strike with copper. The composition of the copper strike bath and conditions for plating were as follows:

Composition of the copper strike bath:
    98 grams $CuSO_4 \cdot 5H_2O$
    15.5 milliliters concentrated $H_2SO_4$
    1 milliliter UBAC Brightener No. 1 [a]
    Sufficient water to make 1 liter of solution Plating conditions:
    Voltage: 2 volts D.C.
    Current density: 10–15 amperes/ft.$^2$
    Current efficiency: 100%
    Anode: electrolytic copper
    Temperature: 75–80° F.
    Time: 4–10 minutes
    Agitated bath or (8b) Strike with nickel. The composition of the nickel strike bath and conditions for plating were as follows:

Composition of the nickel strike bath:
    300–410 grams $NiSO_4 \cdot 6H_2O$
    30–45 grams $NiCl_2 \cdot 3\frac{1}{2} H_2O$
    45 grams $H_3BO_3$
    10 ml. Nickel Brightener N3E [a]
    Sufficient water to make 1 liter of solution Plating conditions:
    Voltage: 6–18 volts D.C.
    Current density: 30–80 amperes/ft.$^2$
    Current efficiency: 100%
    Anode: nickel (99.5%)
    Temperature: 75–155° F.
    Time: 4–10 minutes
    Agitated bath (9) After electroless plating, the resulting electrically conductive product is then electroplated with any combination of conventional plating solutions. The following are examples of typical solutions and conditions for plating with the indicated metal. Numerous other solutions are known and can be utilized, if desired:

(10) Electroplate with bright copper; composition and conditions for plating as follows:

Bright copper bath composition:
    212 grams $CuSO_4 \cdot 5H_2O$
    28.8 milliliters concentrated $H_2SO_4$
    4 milliliters UBAC Brightener No. 1
    75 milligrams NaCl
    Sufficient water to make 1 liter of solution Plating conditions:
    Voltage: 4 volts D.C.
    Current density: 30–40 amperes/ft.$^2$
    Current efficiency: 98–100%
    Anode: electrolytic copper
    Temperature: 75–80° F.
    Time: 1–30 minutes [b]
    Agitated bath

(11) Electroplate with nickel; composition and conditions for plating as follows:

Nickel plating bath composition:
    1136 grams $NiSO_4 \cdot 6H_2O$
    312 grams $NiCl_2$
    185 grams $H_3BO_3$
    Sufficient water to make 1 gallon of solution Plating conditions:
    Voltage: 4 volts D.C.
    Current density: 40–50 amperes/ft.$^2$
    Current efficiency: 95–100%
    Anode: nickel
    Temperature: 75–160° F.
    Time: 1–15 minutes
    Agitated bath

(12) Electroplate with chromium; composition and conditions for plating as follows:

Chrome plating bath composition:
    350 grams $CrO_3$
    2 milliliters concentrated $H_2SO_4$
    Sufficient water to make 1 liter of solution Plating conditions:
    Voltage: 6–8 volts D.C.
    Current density: 90–110 amperes/ft.$^2$
    Current efficiency: 20%
    Anode: lead
    Temperature: 80–140° F.
    Time: 30–90 seconds
    Agitation of the bath effected by the evolution of gases Steps (1) and (2) of the conventional plating process form a cleaning operation to remove any dirt or other foreign matter from the surface of the preformed or molded object to be plated.

When the surface-conditioned molded plastic article is to be immediately plated in the conventional plating process, steps 1 and 2 of the conventional plating process as described above are not required. Thus, following the conditioning treatment of this invention, the resulting plastic article is sensitized with an oxidizable salt (5) followed by the remaining steps as described for electroless and electroplating.

Ordinarily, as mentioned above, the conditioning and plating steps are followed by one or more water rinses.

The following specific example is presented to illustrate further the invention but should not be interpreted as restricting or limiting the invention.

EXAMPLE

A series of plating tests were carried out utilizing plastic slabs formed from an ethylene/propylene copolymer containing about 3.5 weight percent ethylene and 96.5 weight percent propylene, having a melt flow of about 1.75 dg./min. (ASTM D 1238–62T, Condition L) and a density of 0.899 g./cc. (ASTM D 1505–63T), blended with 20 weight percent particulate synthetic silica. The blends were injection molded into specimens about 3 x 5 inches with a thickness of about 50 mils. The specimens were then conditioned in the conditioning bath for variable periods of time ranging from about 2–20 minutes at several bath temperatures. After conditioning, the specimens were rinsed several times in water and electrolessly plated with nickel, then electrolytically plated with first a nickel strike, then bright copper, using conventional techniques. The specimens were then tested to determine their adhesion values.

The conditioning bath used for conditioning the molded specimens was of the following formulation:

| | Weight percent |
|---|---|
| (A) $CrO_3$ | 27.3 |
| (B) $H_3PO_4$ [1] | 46.2 |
| (C) $H_2SO_4$ [2] | 10.1 |
| (D) $H_2O$ | 16.4 |

[1] 85%, d.=1.69 g./cc.
[2] 96%, d.=1.84 g./cc.

such that the ratio of A:B:C:D was 2.7:4.5:1:1.6.

Adhesion values were determined in an adhesion test made by pulling the metal layer from the plastic or filled ---
[a] Supplied by Udylite Corporation, Detroit, Mich.
[b] 45 minutes used in preparing the test specimens.

plastic in an Instron tester at a 90° angle and at a rate of 2 inches per minute. In this test, a steel bar ½-inch wide is laid down the center of the 3½-inch by 1½-inch piece of plated plastic and a sharp knife is used to cut through the electroplate along each side of the bar. One end of the resulting ½-inch-wide strip is pulled loose for ½ to ¾ inch. A clamp attached to a wire about 2 feet along is attached to this loosened metal tab. The plastic or filled plastic is attached to the traverse in the Instron tester and the wire to the upper jaw. The long wire is used so that the angle does not change appreciably as the metal is pulled at a right angle from the plastic surface. The average value of the force, in pounds, required to separate the metal and plastic is multiplied by two to get the force required per lineal inch of contact. In the specimens prepared for the above test, the bright copper electroplate was 1.5 to 2.5 mils thick so that the metal itself would not yield during the test, and the nickel and chromium electroplating steps were not used.

The following results were obtained:

| Run No. | Silica filler | Bath conditions | | Adhesion, lbs./in. |
|---|---|---|---|---|
| | | Time, min. | Temp., °F. | |
| 1 | Neosil "A" (natural) | 5 | 130 | 1.0 |
| 2 | do | 10 | 130 | 1.0 |
| 3 | do | 15 | 130 | 8.0 |
| 4 | do | 20 | 130 | 6.0 |
| 5 | Hi-Sil 404 (synthetic) [1] | 2 | 125 | ([2]) |
| 6 | do | 4 | 125 | 4.0 |
| 7 | do | 5 | 125 | [3] 4.5 |
| 8 | do | 6 | 125 | 4.2 |
| 9 | do | 8 | 125 | 5.5 |
| 10 | do | 10 | 125 | [4] 10.5 |
| 11 | do | 12 | 125 | 10 |
| 12 | do | 14 | 125 | 12.5 |
| 13 | do | 15 | 125 | 7 |
| 14 | do | 16 | 125 | 13 |
| 15 | do | 18 | 125 | 11 |
| 16 | do | 20 | 125 | 12.5 |

[1] A precipitated silica.
[2] Skips in plating.
[3] One sample showed skips.
[4] Average of 4, best=14.0.

The results show that at conditioning times of about 5–10 minutes, the adhesion of the plating to the synthetic silica-polyolefin blend is clearly superior to bonding using natural silica. At longer times, the data show that in general the synthetic silica-polyolefin blends give the best results. These data also indicate that the solubility of the natural silica in the bath is so low that a conditioning time of about 15 minutes or longer is needed to obtain reasonable adhesion of the metal in a low-temperature bath. High bath temperatures would probably speed the process, but such temperatures are not desirable because of possible part warpage.

From the above runs it can be seen that use of the conditioning system of this invention for conditioning a molded plastic article containing a siliceous filler results in the formation of products having satisfactory adhesion of the metal plate to the plastic substrate. They also show that use of the conditioning treatment of the invention permits satisfactory plating of the resulting conditioned plastic articles in conventional metal plating processes.

Reasonable variations or modifications of this invention can be made or followed in view of the foregoing disclosure without departing from the spirit or scope thereof.

That which is claimed is:

1. In a process for electroplating a moldable plastic which comprises the steps of
   (1) incorporating a siliceous filler into said plastic;
   (2) molding the resulting composition of plastic and filler;
   (3) conditioning the molded plastic product of step (2)
   (4) preplating the resulting conditioned product of step (3) with an electrolessly platable metal; and
   (5) electroplating the preplated product of step (4) with a final finish to obtain a metal-plated plastic product, the improvement which comprises conditioning the molded plastic product with a conditioning agent which comprises
   (A) from 15 to 40 weight percent chromic acid,
   (B) from 30 to 65 weight percent phosphoric acid,
   (C) from 2 to 15 weight percent sulfuric acid, and
   (D) from 5 to 35 weight percent water.

2. A process according to claim 1 wherein said plastic is an olefin polymer.

3. A process according to claim 1 wherein said siliceous filler is present in an amount in the range of 1 to 60 weight percent.

4. A process according to claim 3 wherein said siliceous filler is a precipitated silica.

5. The product of the process of claim 1.

6. A process for conditioning a molded plastic product having a siliceous filler incorporated therein so as to render said product susceptible to electroplating which comprises treating said molded plastic product with a conditioning agent formed by admixing
   (A) from 15 to 40 weight percent chromic acid,
   (B) from 30 to 65 weight percent phosphoric acid,
   (C) from 2 to 15 weight percent sulfuric acid, and
   (D) from 5 to 35 weight percent water.

7. A process according to claim 6 wherein said plastic is an olefin polymer.

8. The conditioned molded plastic product of the process of claim 6.

9. A process according to claim 6 wherein said siliceous filler is a precipitated silica.

10. A surface-conditioned treating agent for molded plastics which comprises, in admixture,
    (A) from 15 to 40 weight percent chromic acid,
    (B) from 30 to 65 weight percent phosphoric acid,
    (C) from 2 to 15 weight percent sulfuric acid, and
    (D) from 5 to 35 weight percent water.

References Cited

UNITED STATES PATENTS

| 3,649,476 | 3/1972 | Khelghatian et al. | 204—30 |
| 3,471,320 | 10/1969 | Saubestre | 204—30 |

FOREIGN PATENTS

| 1,081,343 | 8/1967 | Great Britain | 117—47 A |

JOHN H. MACK, Primary Examiner

W. I. SOLOMON, Assistant Examiner

U.S. Cl. X.R.

117—47 A; 156—2; 204—30; 252—79.2

UNITED STATES PATENT OFFICE

CERTIFICATE OF CORRECTION

Patent No. 3,758,388                    Dated: Sept. 11, 1973

It is certified that error appears in the above-identified patent and that said Letters Patent are hereby corrected as shown below:

After the title and inventor's name, "c/o" should read

—assignor to—.

Signed and sealed this 15th day of January 1974.

(SEAL)
Attest:

EDWARD M. FLETCHER, JR.          RENE D. TEGTMEYER
Attesting Officer                 Acting Commissioner of Patents